Figure 1:
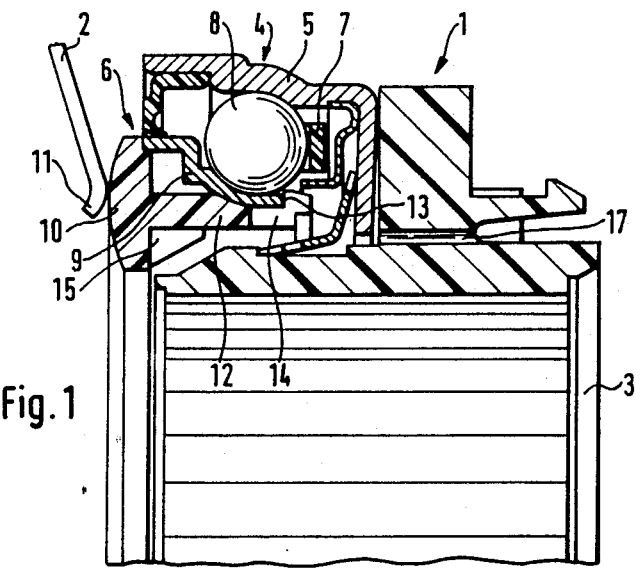

United States Patent [19]

Parzefall

[11] Patent Number: 4,969,755
[45] Date of Patent: Nov. 13, 1990

[54] INNER BEARING RING OF A CLUTCH RELEASE BEARING

[75] Inventor: Walter Parzefall, Bubenreuth, Fed. Rep. of Germany

[73] Assignee: INA Walzlager Schaeffler KG, Fed. Rep. of Germany

[21] Appl. No.: 518,143

[22] Filed: May 3, 1990

Related U.S. Application Data

[63] Continuation of Ser. No. 280,636, Dec. 6, 1988, abandoned.

[30] Foreign Application Priority Data

Dec. 23, 1987 [DE] Fed. Rep. of Germany ....... 3743853

[51] Int. Cl.⁵ .................... F16D 23/14; F16C 19/00
[52] U.S. Cl. .................. 384/612; 192/110 B; 384/617
[58] Field of Search ............... 384/535, 609, 611, 612, 384/617; 192/110 B, 98

[56] References Cited

U.S. PATENT DOCUMENTS

| | | | |
|---|---|---|---|
| 3,913,714 | 10/1975 | Camp | 192/110 B X |
| 4,204,720 | 5/1980 | Otani | 384/617 |
| 4,448,294 | 5/1984 | Brandenstein et al. | 192/110 B X |
| 4,555,190 | 11/1985 | Lederman | 384/609 X |

FOREIGN PATENT DOCUMENTS

| | | | |
|---|---|---|---|
| 1259148 | 1/1968 | Fed. Rep. of Germany | 384/611 |
| 2162365 | 6/1973 | Fed. Rep. of Germany | 192/98 |
| 90463 | 6/1972 | German Democratic Rep. | |
| 292278 | 10/1953 | Switzerland | 384/609 |
| 1022077 | 3/1966 | United Kingdom | 384/609 |
| 2156472 | 10/1985 | United Kingdom | 192/98 |

*Primary Examiner*—Thomas R. Hannon
*Attorney, Agent, or Firm*—Bierman and Muserlian

[57] ABSTRACT

An inner bearing ring of a clutch release bearing for an automotive vehicle clutch equipped with diaphragm springs, whereby the clutch release bearing comprises a rolling bearing with two concentric bearing rings arranged on a sliding sleeve between which rings rolling elements roll, and whereby a washer is fixed on the side face of the rotating inner ring which faces the clutch and which during operation acts with the spring finger ends of the diaphragm spring, characterized in that the inner ring (6) is formed from a metal raceway element (9) and an annular element, whereby the annular element forms the circular washer (10) which with its side not facing the clutch is supported on the raceway element (9) and which has an axial extension (12) which is inserted clearance-free into the bore of the metal raceway element (9) and which on its end (13) opposite the washer (10) engages behind the end of the metal raceway element (9) so that the raceway element (9) is retained in a form-locking way on the annular element.

7 Claims, 1 Drawing Sheet

U.S. Patent  Nov. 13, 1990  4,969,755

INNER BEARING RING OF A CLUTCH RELEASE BEARING

This application is a continuation of U.S. Pat. application Ser. No. 280,636, filed Dec. 6, 1988, now abandoned.

STATE OF THE ART

Inner bearing rings of a clutch release bearing for an automotive vehicle clutch fitted with diaphragm springs, whereby the clutch release bearing is comprised of a rolling bearing with two concentric bearing rings arranged on a sliding sleeve, between which rolling elements roll and whereby on the side face of the rotating inner ring which faces the clutch a washer is secured, which washer acts during operation with the ends of the fingers of the diaphragm spring are already well known such as described in DD-PS No. 90,463. They consist of a ball bearing with machined rings and a separate washer connected to the inner or outer ring by means of a special support washer. However, the bearing described is costly due to its machined execution and it requires additional assembly expenditure due to its separate components. A further disadvantage lies in the fact that the design shown takes up a lot of axial space which is not always available.

OBJECTS OF THE INVENTION

It is an object of the invention to manufacture a bearing of this type in a particularly economical way with fewer component parts and whereby the axial design length is greatly reduced.

This and other objects and advantages of the invention of the invention will become obvious from the following detailed description.

THE INVENTION

The novel inner bearing ring of the invention of a clutch release bearing for an automotive vehicle clutch equipped with diaphragm springs, whereby the clutch release bearing comprises a rolling bearing with two concentric bearing rings arranged on a sliding sleeve between which rings rolling elements roll, and whereby a washer is fixed on the side face of the rotating inner ring which faces the clutch which during operation acts with the spring finger ends of the diaphragm spring, is characterized in that the inner ring (6) is formed from a metal raceway element (9) and an annular element, whereby the annular element forms the circular washer (10) which with its side not facing the clutch is supported on the raceway element (9) and which has an axial extension (12) which is inserted clearance-free into the bore of the metal raceway element (9) and which on its end (13) opposite the washer (10) engages behind the end of the metal raceway element (9) so that the raceway element (9) is retained in a form-locking way on the annular element.

The design of the invention has the advantage that the production and assembly costs are considerably reduced by there being a smaller number of individual components and since the axial length of the bearing is reduced. In a preferred execution of the invention, the design is such that the washer is made of a polymeric material which results in the particular advantage that both the metal raceway element and the polymeric annular element are particularly simple components to connected to each other permanently and clearance-free in a simple way by a snap connection. Preferably, the polymeric material is provided with wear reducing materials such as glass fibers or especially ceramic particles in the area of the annular washer. However, there is also the possibility of manufacturing the whole annular element from a ceramic material and connecting it in a suitable way to the metal raceway element.

In another variation of the invention, the end of the axial extension which engages behind the metal raceway element is subdivided by a number of slots into resilient tabs. The resilient formation on the end of the axial extension simplifies the snapping-in of the metal raceway elements considerably and thus aids assembly. Another feature of the invention is that between the circular washer and the axial extension, several stiffening ribs are arranged distributed over the periphery which results in that the washer is rigid in the axial direction and thus can take up the loads which occur during operation without deformation.

A further variant of the invention provides that the stiffening ribs are curved in the fashion of fan blades and for this, in a further development of the invention the sliding sleeve has openings or bores at the end of the inner bearing ring not facing the clutch which results in the advantage that the fan blades, via the openings or bores in the sliding sleeve, suck in air and thus produce an air flow which serves to cool the bearing and as well as keep dirt particles, that can arise due to abrasion or the like, away from the bearing. Contamination of the grease is thereby prevented and the bearing service life is prolonged.

In a further embodiment of the invention, the washer on its side which faces the diaphragm spring has at least one radially extending rib which engages in a form-locking manner between two adjacent spring finger ends of the diaphragm spring which avoids relative motion between the inner ring and the spring finger ends and thereby prevents excessive wear.

Referring now to the drawings

Figure 2:
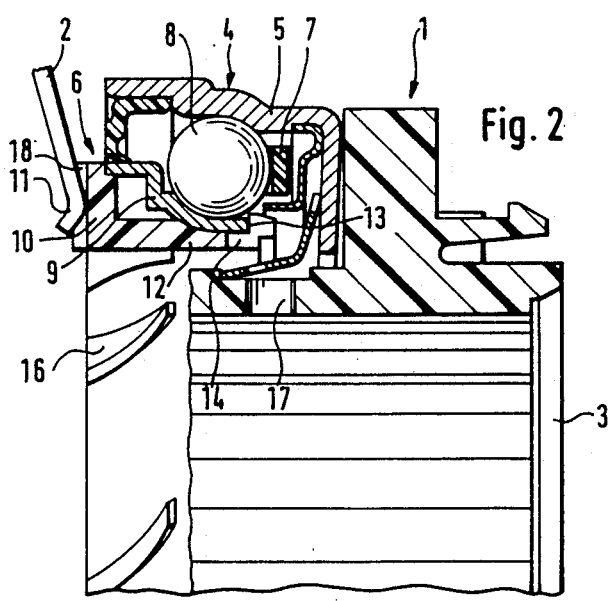

FIGS. 1 and 2 are partial longitudinal cross-sectional view through a clutch release bearing of the invention.

In FIG. 1, the clutch release bearing (1) of an automotive vehicle clutch (not shown) equipped with diaphragm springs (2) consists of a rolling bearing (4) arranged on a sliding sleeve (3). The bearing has a stationary outer ring (5) and a rotating inner ring (6) between which balls (8) roll kept apart in the cage (7). The rotating inner ring (6) consists of a metal raceway element (9) and an annular element made from polymeric material, whereby the annular element forms the circular washer (10) for the spring finger ends (11) of the diaphragm spring (2) and is supported with its surface not facing the clutch on the raceway element (9). In addition, the washer (10) has an axial extension (12) which is inserted clearance-free into the bore of the metal raceway element (9) and which on its end (13) opposite the washer (10) engages behind the end of the metal raceway element (9) so that the raceway element (9) is retained in a form-locking way on the annular element. Thereby, the end (13) of the axial extension engaging behind the metal raceway element (9) is subdivided by a number of slots (14) into resilient tabs.

According to the example of FIG. 1, several stiffening ribs (15) are arranged distributed over the periphery between the circular washer (10) and the axial extension (12). In contrast to this, FIG. 2 shows stiffening ribs (16) which are formed curved in the fashion of fan blades.

According to FIGS. 1 and 2, the sliding sleeve 3 on the end of the inner bearing ring 6 not facing the clutch has bores 17 through which air is sucked in by means of correspondingly shaped stiffening ribs 15 or the fan blades, and thus a current of air is produced which serves to cool the bearing and keeps dirt particles out of the bearing. The washer (10) on its side facing the diaphragm spring (2) has at least one radially extending rib (18) which engages in a form-locking way between two adjacent spring finger ends (11) of the diaphragm spring (2).

Various modifications of the inner bearing ring of the invention may be made without departing from the spirit or scope thereof and it should be understood that the invention is intended to be limited only as defined in the appended claims.

What I claim is:

1. An inner bearing ring of a clutch release bearing for an automotive vehicle clutch equipped with diaphragm springs, wherein the clutch release bearing comprises a rolling bearing with a fixed outer ring and a rotating inner ring concentric with this, between which rings rolling elements roll, the rolling bearing being arranged on a sliding sleeve, wherein a circular ring-shaped washer is fixed on an end face of the rotating inner ring facing the clutch and cooperates with the spring finger ends of the diaphragm spring during operation and wherein the inner ring is formed from a metal raceway element and an annular element which has an axial extension which is inserted clearance-free into a bore of the metal raceway element and which at its end away from the washer engages behind the end of the metal raceway element so that the raceway element is retained in a form-locking way on the annular element, characterized in that the metal raceway element is a thin-walled race ring made of sheet metal, and the annular element and the circular ring-shaped washer, which with its side not facing the clutch is supported on the raceway element, together form a one-piece component.

2. An inner bearing ring of claim 1 wherein the annular element is made from polymeric material.

3. An inner bearing ring of claim 1 wherein the end of the axial extension which engages behind the metal raceway element is subdivided by a number of slots into resilient tabs.

4. An inner bearing ring of claim 1 wherein between the circular ring-shaped washer and the axial extension, several stiffening ribs are arranged distributed over the periphery.

5. An inner bearing ring of claim 4 wherein the stiffening ribs are curved in the fashion of fan blades.

6. An inner bearing ring of claim 1 wherein the sliding sleeve has openings or bores on its end not facing the clutch.

7. An inner bearing ring of claim 1 wherein the washer has at least one radially extending rib on its end face facing the diaphragm spring, which rib engages in a form-locking way between two adjacent spring finger ends of the diaphragm spring.

* * * * *